(12) United States Patent
Kishiyama et al.

(10) Patent No.: US 8,743,714 B2
(45) Date of Patent: Jun. 3, 2014

(54) RADIO COMMUNICATIONS SYSTEM, BASE STATION, USER APPARATUS, AND METHOD

(75) Inventors: Yoshihisa Kishiyama, Yokosuka (JP);
Motohiro Tanno, Yokohama (JP);
Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 317 days.

(21) Appl. No.: 13/001,073

(22) PCT Filed: Jun. 25, 2009

(86) PCT No.: PCT/JP2009/061576
§ 371 (c)(1),
(2), (4) Date: Mar. 25, 2011

(87) PCT Pub. No.: WO2010/001798
PCT Pub. Date: Jan. 7, 2010

(65) Prior Publication Data
US 2011/0170438 A1    Jul. 14, 2011

(30) Foreign Application Priority Data
Jul. 1, 2008   (JP) .................................. 2008-172813

(51) Int. Cl.
*H04J 1/16* (2006.01)
(52) U.S. Cl.
USPC ............ 370/252; 370/328; 370/332; 370/210
(58) Field of Classification Search
None
See application file for complete search history.

(56) References Cited

U.S. PATENT DOCUMENTS

| 2006/0276189 | A1* | 12/2006 | Kiernan et al. | ............... 455/436 |
| 2009/0296563 | A1* | 12/2009 | Kishiyama et al. | ........... 370/210 |
| 2009/0296925 | A1* | 12/2009 | Kishiyama et al. | ............. 380/33 |

FOREIGN PATENT DOCUMENTS

| EP | 1898542 A1 * | 3/2008 |
| EP | 1983792 A1 * | 10/2008 |
| JP | 2006-311475 A | 11/2006 |
| JP | 2007-089113 A | 4/2007 |
| JP | 2007-214822 A | 8/2007 |
| JP | 2007214822 A * | 8/2007 |
| JP | 2008-124576 A | 5/2008 |
| WO | 2006107701 A2 | 10/2006 |

OTHER PUBLICATIONS

Patent Abstracts of Japan, Publication No. 2007-214822, dated Aug. 23, 2007, 1 page.

(Continued)

*Primary Examiner* — Willie J Daniel, Jr
(74) *Attorney, Agent, or Firm* — Osha Liang LLP

(57) ABSTRACT

A mobile communications system having a first base station and one or more second base stations is disclosed, wherein the first base station includes a first generator which generates a first known signal for use in common between the first base station and the second base station and a second known signal use specific to each of the first base station and the second base station, and a radio transmitter which wirelessly transmits, to a subordinate terminal apparatus, the first known signal and the second known signal which are generated by the first generator.

12 Claims, 10 Drawing Sheets

(56) References Cited

OTHER PUBLICATIONS

Patent Abstracts of Japan, Publication No. 2007-089113, dated Apr. 5, 2007, 1 page.
3GPP TSG-RAN WG1 Meeting #44, R1-060670, Denver, USA, Feb. 13-17, 2006, "Interference Mitigation by Partial Frequency Reuse," 5 pages.
3GPP TS 36.211 V8.3.0, May 2008, "Physical Channels and Modulation," 77 pages.
International Search Report issued in PCT/JP2009/061576, mailed on Aug. 4, 2009, with translation, 7 pages.
Written Opinion issued in PCT/JP2009/061576, mailed on Aug. 4, 2009, 3 pages.
Japanese Office Action for Application No. 2008-172813, mailed on May 22, 2012 (4 pages).
Patent Abstracts of Japan for Japanese Publication No. 2006-311475, publication date Nov. 9, 2006 (1 page).
Patent Abstracts of Japan for Japanese Publication No. 2008-124576, publication date May 29, 2008 (1 page).

* cited by examiner

Related Art

RADIO COMMUNICATIONS SYSTEM, BASE STATION, USER APPARATUS, AND METHOD

BACKGROUND OF THE INVENTION

1. Field of the Invention

The present invention generally relates to radio communications systems and particularly relates to radio communications systems, base station and user apparatuses, and methods.

2. Description of the Related Art

In a related-art time division multiple access (TDMA) mobile communications system, mutually different frequencies are used in neighboring cells. A certain group of frequencies is used for a set of multiple cells, while the same group of frequencies is used for a different set of cells that are geographically distant. Such a scheme is preferable from a viewpoint of reducing other-cell interference, but is not high in frequency utilization efficiency.

On the other hand, in a W-CDMA (Wideband Code Division Multiple Access) scheme such as IMT-2000, users are distinguished with spread codes, so that the same frequency is used at all cells. Such a technique is called "one-cell frequency repetition". The one-cell frequency repetition significantly increases frequency utilization efficiency and system capacity. It is anticipated that realization of the one-cell frequency repetition is also going to be needed even in future mobile communications systems such as IMT-Advanced (also called LTE-Advanced in 3GPP (3rd Generation Partnership Project), which is to be studied in the future.

However, there is a concern for a problem that, as the same frequency is used among neighboring cells, interference level (intercell interference) is likely to become large, particularly at a cell edge.

For intracell interference, in the W-CDMA scheme, OVSF (orthogonal variable spreading factor) code is used for downlink in order to realize intracell orthogonalization (i.e., interuser orthogonalization). However, in the W-CDMA scheme, orthogonalization cannot be realized in a multi-path environment, so that it is not orthogonal for uplink. In E-UTRA (Evolved UMTS Terrestrial Radio Access) scheme, orthogonalization is realized by performing frequency scheduling at a base station for both uplink and downlink.

On the other hand, for the intercell interference, in E-UTRA scheme, a technique called intercell interference coordination (ICIC) is used. In this technique, in addition to the fact that a frequency which is common to all cells is used, a frequency which differs from cell to cell is used at the cell edge (see Non-patent document 1).

FIG. 1 is a diagram illustrating the intercell interference coordination, which is adopted in the E-UTRA scheme. In the intercell interference coordination, radio resources are divided into radio resources R1-R3 which are usable only at corresponding base stations, and radio resources R4-R8 which are usable in a manner common to all of the base stations. The radio resources R1-R3 are frequencies allocated to the user at the cell edge, while radio resources R4-R8 are frequencies allocated to a user of a region other than the cell edge (for example, a user located in the vicinity of the base station, etc.) The radio resource R1 is used for a user belonging to the cell edge of a base station BS1, while it is not used for a neighboring base station. Similarly, the radio resource R2 is used for a user belonging to the cell edge of a base station BS2, while it is not used for a neighboring base station. The radio resource R3 is used for a user belonging to the cell edge of a base station BS3, while it is not used for a neighboring base station. Thus, the user of a cell edge of the base stations BS1-BS3 may conduct communications with small interference.

Information on a radio resource usable only at one of the base stations is shared among the base stations by using a backhaul (core network) and/or radio control signal. Here, such intercell interference coordination is called distributed autonomous intercell interference coordination.

Moreover, in order to reduce the intercell interference, a technique is also being studied in which one base station collectively manages radio resources of neighboring base stations. Such an intercell interference technique is used for decreasing intersector interference when a cell of a base station is divided into multiple sectors, or for decreasing intercell interference when there is a protruding cell.

FIG. 2 is a diagram illustrating intercell interference coordination for one base station BS1 to collectively manage radio resources of neighboring base stations BS2 and BS3. The base station BS1, which is connected to the neighboring base stations BS2 and BS3 via an optical fiber, etc., collectively allocates radio resources used by the neighboring base stations BS2 and BS3. For example, the base station BS1 allocates radio resources R1, R2, and R5 to users within the base station BS1, allocates radio resources R3 and R4 to users within the base station BS2, and allocates radio resources R6-R8 to users within the base station BS3.

In this way, the base station BS1 may allocate radio resources without causing interference. Here, such intercell interference coordination is called central control intercell interference coordination. Moreover, a base station which collectively manages radio resources is called a control base station or a central control base station, while a base station which manages radio resources with the control base station is called a remote base station.

Non-patent Document 1: 3GPP R1-060670, Siemens, "Interference Mitigation by Partial Frequency Reuse"

Non-Patent Document 2: 3GPP TS36.211

SUMMARY OF THE INVENTION

Problem(s) to be Solved by the Invention

For distributed autonomous intercell interference coordination, radio resources for the cell-edge user are occupied by all of the base stations. For example, when the cell-edge user of the base station BS1 increases, allocation of the radio resource R1 increases. This information may be reported in a backhaul control signal to another base station to increase the radio resource R1. However, this represents low-speed control, so that a quick intercell orthogonalization cannot be realized.

On the other hand, for central control intercell interference coordination, the control base station collectively manages radio resources, making it possible to realize quick intercell orthogonalization. However, when the number of base stations managed by the control base station increases, processing burden of the control base station increases.

Moreover, for the distributed autonomous intercell interference coordination, a reference signal transmitted by each base station includes a sequence which differs from cell to cell. In other words, a cell ID is applied which differs from cell to cell. The reference signal is a signal which is known between the base station and the user apparatus. The user apparatus performs channel estimation, and measurement of received quality based on the reference signal.

When the reference signal is applied to a central control cell, a separate optimization is required. For the central control cell, it is expected to be applied to a cell with a small cell radius, so that handover occurs frequently when a sequence which differs from cell to cell is included in a reference signal.

Moreover, when a sequence which is common to all cells is included in a reference signal, received quality for each cell cannot be measured.

Thus, the present invention is intended to solve the problems as described above, and the object of the present invention is to provide a radio communications system, a base station, a user apparatus, and a method that make it possible to reduce handover processing burden between the base station and neighboring base stations, and to measure received quality in each cell.

Means for Solving the Problem

In order to solve the problem as described above, the present mobile communications system has a first base station and one or more second base stations, wherein the first base station includes a first generator which generates a first known signal for use in common between the first base station and the second base station and a second known signal for use specific to each of the first base station and the second base station, and a first radio transmitter which wirelessly transmits, to a subordinate terminal apparatus, the first known signal and the second known signal which are generated by the first generator.

The present base station includes a first known signal generator which generates a first known signal for use in common between one or more base stations to be supervised;

a second known signal generator which generates multiple second known signals for use specific to the respective base stations;

a radio transmitter which wirelessly transmits, to a subordinate terminal apparatus, the first known signal and second known signals generated by the first known signal generator and the second known signal generator; and a wired transmitter which transmits, over wire to the one or more base stations, information for generating the first known signal and which transmits, over wire to the one or more base stations, information for generating the second known signals to be used specifically by the respective base stations.

The present user apparatus is a user apparatus in a mobile communications system having a first base station and a second base station, the user apparatus including a received quality measuring unit which measures received quality based on a downlink signal; and a reporting unit which reports, to a base station which covers an area in which the user apparatus is located, the received quality measured by the received quality measuring unit, wherein the received quality measuring unit measures the received quality based on second known signals for use specific to the first base station and the second base station, respectively, that are transmitted by the first base station or the second base station.

The present method is a method in a mobile communications system having a first base station and a second base station, including a signal generating step in which the first base station and the second base station generate a first known signal for use in common between the first base station and the second base station and second known signals for use specific to the first base station and the second base station, respectively; and a step in which the first base station and the second base station wirelessly transmit, to a subordinate terminal apparatuses, the first known signal and the second known signal generated in the signal generating step.

Advantage of the Invention

Embodiments of the present invention make it possible to achieve a radio communications system, a base station, a user apparatus, and a method that make it possible to reduce handover processing burden between the base station and neighboring base stations, and to measure received quality in each cell when a technique is applied in which one base station collectively manages radio resources for the neighboring base stations.

DESCRIPTION OF THE PREFERRED EMBODIMENTS

Description of Notations $100_n$ ($100_1$, $100_2$, ... $100_n$) control base stations; 102 user information receiver; 104 unit for receiving information within base station; 106 unit for transmitting information within base station; 108 resource allocation determining unit; 110 allocation information transmitter; 112 transmitter; 1122 channel multiplexer; 1124 inverse fast Fourier transforming unit (IFFT); 114 base station group determining unit; 116 reference signal generator; $200_m$ ($200_1$, $200_2$, ..., $200_m$) remote base stations; 202 user information receiver; 204 unit for transmitting information within base station; 206 allocation information receiver; 208 transmitter; 210 reference signal generator; 300 user apparatus; 302 fast Fourier transforming unit (FFT); 304 channel separator; 306 channel/received quality estimator; 308 common control channel demodulator; 310 unit for estimating CQI, PMI, and optimal connection base station

BEST MODE OF CARRYING OUT THE INVENTION

With reference to the drawings, a description is given below with regard to embodiments of the present invention. Throughout the drawings for explaining the embodiments, same letters are used for those having the same functions, so that repetitive explanations are omitted.

Radio Communications System

Figure 1:
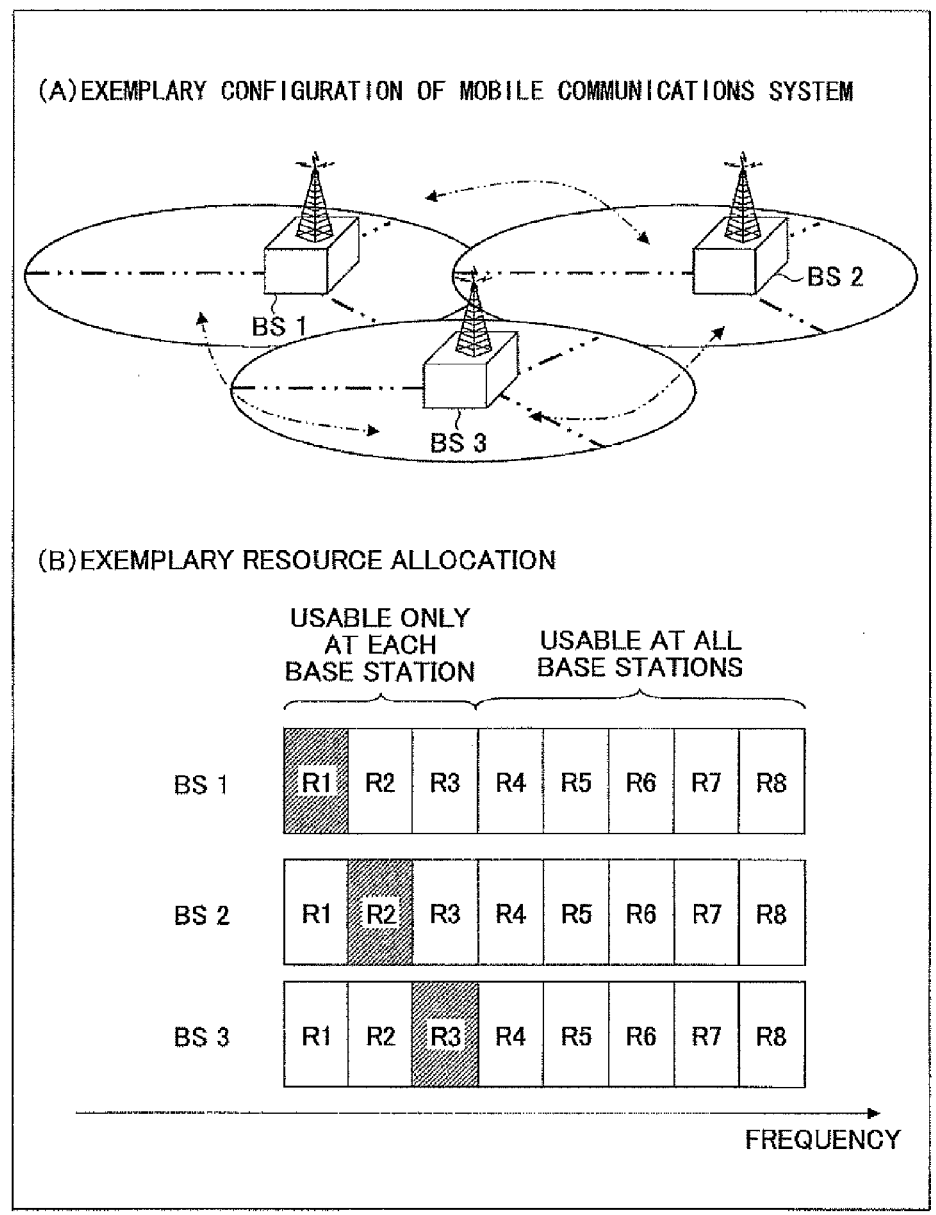
FIG. 1 is an explanatory drawing illustrating a radio communications system.
Figure 2:
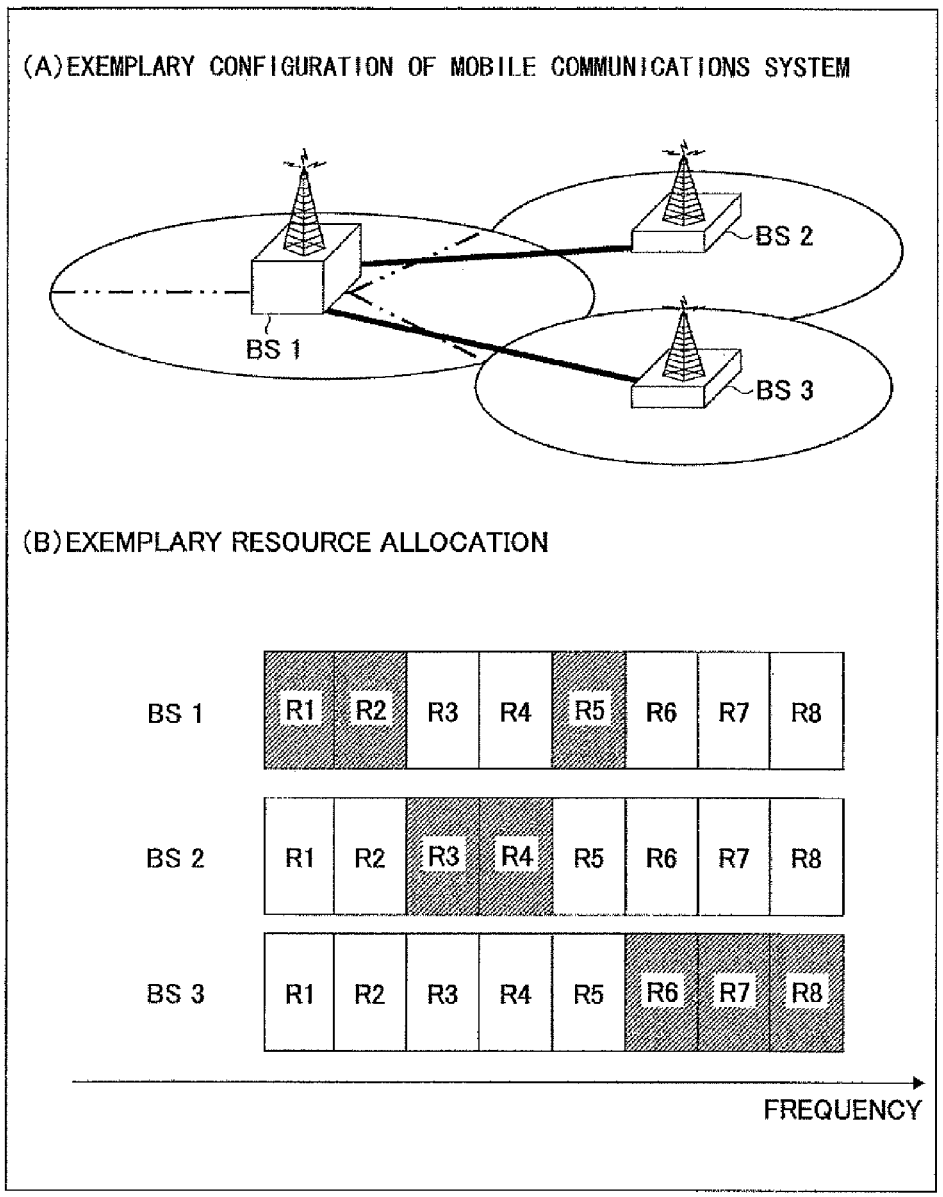
FIG. 2 is another explanatory drawing illustrating the radio communications system.
Figure 3:
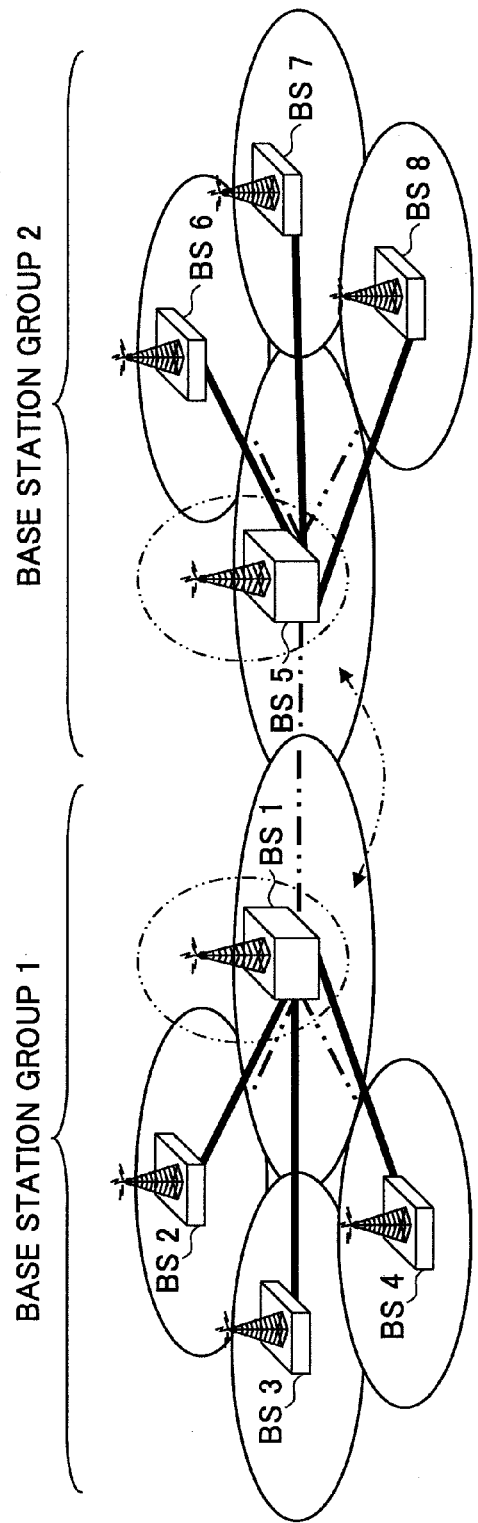
FIG. 3 is an explanatory diagram illustrating the radio communications system according to an embodiment.

With reference to FIG. 3, an explanation is given for a radio communications system having user apparatuses and base stations according to the present embodiment. The user apparatuses may be called mobile station apparatuses.

The radio communications system is a system to which Evolved UTRA and UTRAN (also known as Long Term Evolution) is applied, for example. In the radio communications system, distributed autonomous intercell interference coordination and central control intercell interference coordination are used together. The distributed autonomous intercell interference coordination and the central control intercell interference coordination may be used together to reduce processing burden of the control base station while realizing quick intercell orthogonalization.

In the radio communications system, as radio access schemes, OFDMA (orthogonal frequency division multiple access) is applied for downlink, while SC-FDMA (single-carrier frequency division multiple access) is applied for uplink. The OFDMA is a scheme for dividing a frequency band into multiple narrow frequency bands (sub-carriers) and overlaying data onto the respective frequency bands. The SC-FDMA is a transmission scheme which divides a frequency bandwidth and transmits using different frequency bands among multiple user apparatuses to make it possible to reduce interference between the user apparatuses.

The radio communications system has multiple base station groups (a BS group 1 and a BS group 2). Here, a base station group is a collection of base stations for which radio resources are managed (controlled) by one control base station (eNB: eNodeB). Base station groups 1 and 2 have respective control base stations, BS1 and BS5. The control base station BS1 collectively manages (controls) radio resources for remote base stations BS2-BS4 within the base station group 1 and radio resources for the control base station BS1. The control base station BS5 collectively manages (controls) radio resources for base stations BS6-BS8 within the base station group 2 and radio resources for the control base station BS5. In other words, within the base station group, central control intercell interference coordination is performed by the control base station. FIG. 3 shows an exemplary case in which a control base station manages radio resources for three remote base stations, but managing radio resources for remote base stations numbering any number other than three may also be applied.

On the other hand, for a user located in a border of a communications area covered by a base station which belongs to a base station group, the control base station BS1 allocates radio resources usable only at the corresponding base stations. For example, for a user located in a cell-edge region close to the control base station BS5 out of an area covered by the control base station BS1, the control base station BS1 allocates radio resources usable only at the corresponding base stations. Information on a radio resource usable only at one base station is shared among the control base stations by using a backhaul and/or radio control signal. In other words, within the base station group, distributed autonomous intercell interference coordination is performed. Distributed autonomous intercell interference coordination is performed among the base station groups, so that radio resources are collectively managed by the control base station within the base station group, making it possible to reduce intercell interference. It suffices for the control base station to manage radio resources of the base stations within the base station group, so that even when the number of base stations increases, it is made possible to reduce the processing burden of the control base station.

Figure 4:
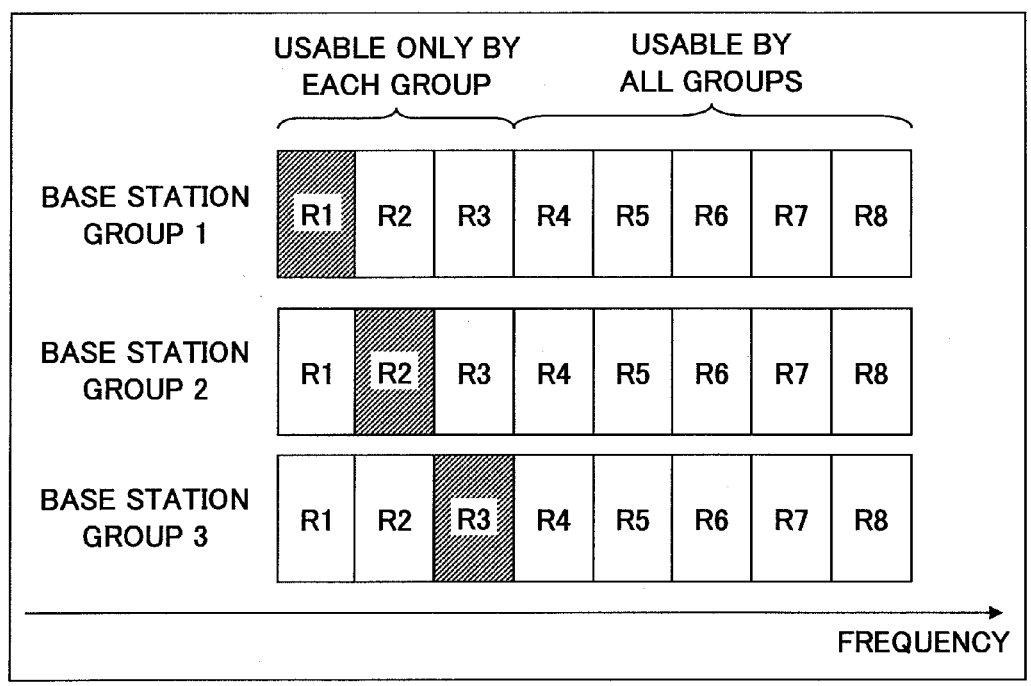
FIG. 4 is an explanatory diagram illustrating an example of resource allocation in the radio communications system according to one embodiment.

An exemplary radio resource allocation for using distributed autonomous intercell interference coordination and central control intercell interference coordination is explained with reference to FIG. 4.

In the intercell interference coordination according to the present embodiment, radio resources include radio resources R1-R3, which are usable only by the respective base station groups and radio resources R4-R8, which are usable in a manner common to all base station groups. The radio resources R1-R3 are frequencies allocated to users located at a communications area border of a base station group. The radio resources R4-R8 are frequencies allocated to users located at a location other than the communications area border of the base station group. The radio resources R4-R8 are allocated, for example, to a user located at a cell border between a remote base station and a control base station, and a user located in the vicinity of a base station.

For example, the radio resource R1 is used for a user belonging to a communications area border of a base station group 1, while the radio resource R1 is not used in neighboring base station groups 2 and 3. Similarly, the radio resource R2 is used for a user belonging to a communications area border of a base station group 2, while the radio resource R2 is not used in neighboring base station groups 1 and 3. The radio resource R3 is used for a user belonging to a communications area border of the base station group 3, while it is not used for neighboring base station groups 1 and 2. Thus, a user located in the communications area border of the base station groups 1-3 may conduct communications with small interference.

The control base station of the base station group 1 allocates radio resources to a base station within the base station group using the radio resource R1 which is usable by only the base station group 1 and the radio resources R4-R8 which are usable in a manner common to all base station groups. For example, the control base station BS1 in FIG. 3 allocates the radio resources R1 and R4 to users within the control base station BS1, allocates the radio resources R5 and R6 to users within the base station BS2, and allocates the radio resource R8 to users within the base station BS4. When the intercell interference is low with mutually distant communications areas such as the base stations BS2 and BS4 in FIG. 3, the control base station BS1 in FIG. 3 may allocate the same radio resource to a user within the base station BS2 and a user within the base station BS4.

When the intercell interference is small with mutually distant communications areas, the same radio resource is allocated, making it possible to achieve effective utilization of radio resources and to improve throughput of users within the cell. Moreover, it is made possible to improve throughput for the cell-edge user.

In the above-described embodiment, radio resources R1-R3 have been described as usable only by corresponding base station groups. However, the radio resources R1-R3 may be set such that they are not usable at other base station groups. For example, the radio resource R1 is unusable by only the base station group 1, the radio resource R2 is unusable only by the base station group 2, and the radio resource R3 is unusable only by the base station group 3.

Moreover, in a radio communications system according to the present embodiment, the control base station and the remote base stations transmit a downlink reference signal (DL-RS) as a pilot signal which is used in a manner common among UEs. For example, the DL RS is used for channel estimation for decoding physical downlink shared channel (PDSCH), physical downlink control channel (PDCCH), physical control format indicator channel (PCFICH), HARQ indicator channel (PHICH: physical HARQ indicator channel) and for calculation of CQI (channel quality indicator), which is radio quality information for downlink. A reference signal transmitted by a control base station and a remote base station includes two sequences. Based on the reference signal, the user apparatus performs channel estimation, and measurement of received quality. The two sequences include a sequence to be used in common among the base station group (below-called common RS), and multiple independent sequences to be used specifically for the assigned one of the control base station and the remote base station (below-called independent RS). For example, the common RS differs from one control base station to another. Moreover, the common RS differs for remote stations which belong to a different control base station, for example. Furthermore, the independent RS is independent among remote base stations which belong to the control base station. In other words, the independent RS differs among remote base stations which belong to the control base station. In a radio communications system according to the present embodiment, the common RS and independent RS are jointly used.

In an example shown in FIG. 3, the common RS is transmitted from the control base station BS1 and the remote base stations BS2-BS4. The common RS is synthesized over the air and received at the user apparatus. The user apparatus does not know which base station the common RS is transmitted from. In other words, there are no apparent cell borders among the four base stations. A common RS is transmitted from the control base station BS1 and remote base stations BS2-BS4, so that a common control channel may be transmitted from the four base stations simultaneously, making it possible to improve received quality for a user apparatus located at the cell border. Here, the common control channel includes broadcast and paging channels.

Moreover, a burden in a handover process between a control base station and a remote base station which belongs to the control base station may be reduced. It is anticipated that applying a remote base station causes a cell radius to become small in the future. In such a case, it is anticipated that, when independent RSs are applied to a control base station and each of the remote base stations which belong to the control base station, handover occurs frequently. A common RS may be applied between a control base station and a remote base station which belongs to the control base station to reduce the burden of the handover process as a cell ID does not change.

Moreover, in an example shown in FIG. 3, independent RSs are transmitted from the control base station BS1 and the remote base stations BS2-BS4. The user apparatus receives data transmitted by one base station. Therefore, the user apparatus needs to measure the received quality, for example, CQI, for each base station. Moreover, the user apparatus needs to measure the received quality (for example, CQI) for determining a precoding matrix indicator for each base station. In such a case, an independent RS is used. Moreover, based on the independent RS, the user apparatus performs the process of selecting an optimal connecting cell at high speed. For example, when a connecting cell is switched between a control base station and a remote base station which belongs to the control base station, a process of switching a transmission antenna is performed. This process is performed at a physical layer. Moreover, when a connecting cell is switched to a different control base station or a remote base station which belongs to the different control base station, the process is performed at an upper layer.

Control base station and remote base station

Figure 5:
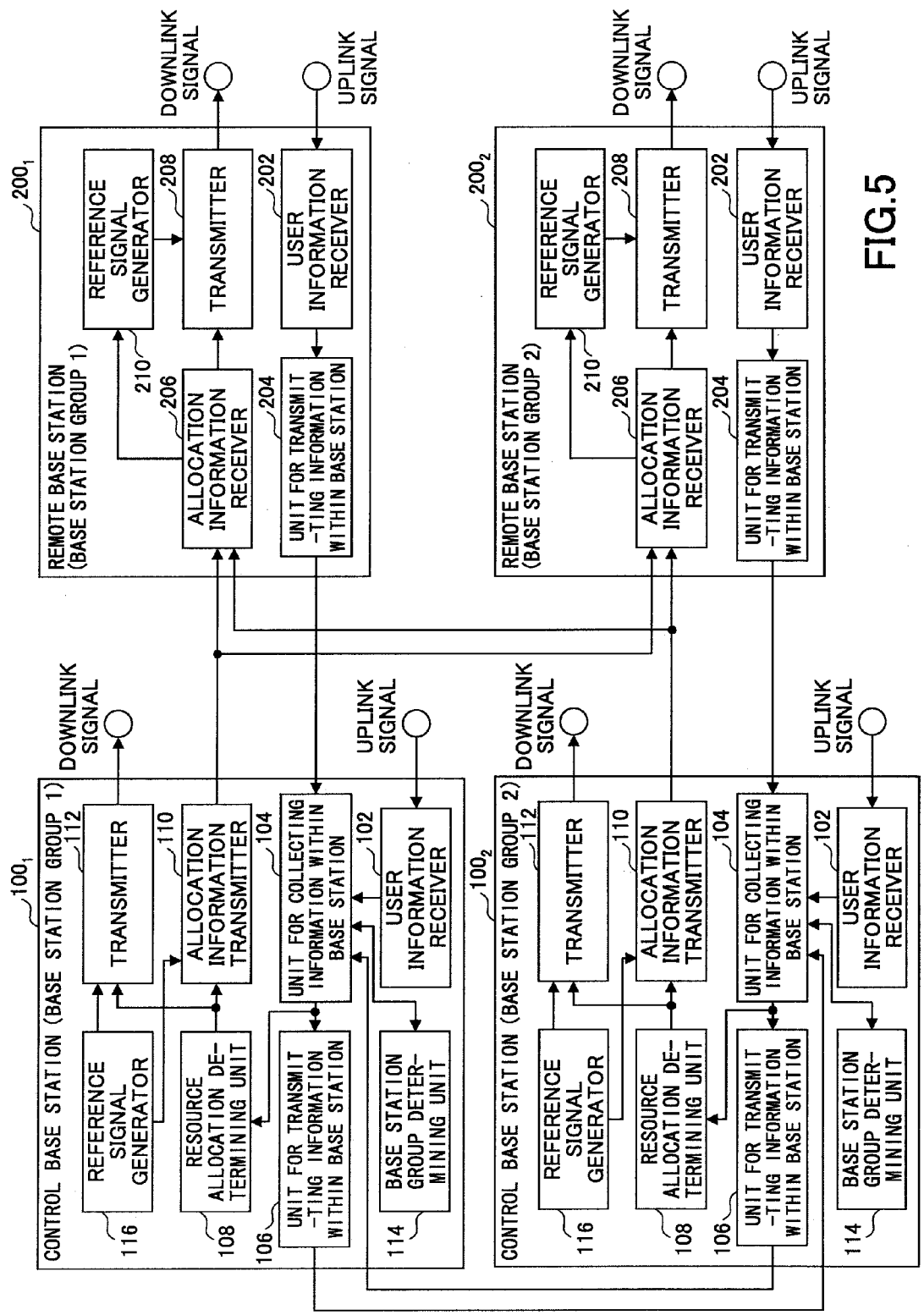
FIG. 5 is a partial block diagram illustrating the control base station and the remote base station according to one embodiment.

Control base stations and remote base stations according to the present embodiment are explained with reference to FIG. 5.

A radio communications system according to the present embodiment has one or more control base stations $100_n$ (n is an integer greater than 0). Moreover, the control base station $100n$ according to the present embodiment has one or more remote base stations $200_m$ (where m is an integer greater than 0). FIG. 5 shows, as an example, a case such that the radio communications system has two control base stations $100_1$ and $100_2$. Moreover, in FIG. 5, a case is shown of one control base station having one remote base station, as an example. For example, a base station group 1 has a control base station $100_1$ and a remote base station $200_1$. Moreover, for example, a base station group 2 has a control base station $100_2$ and a remote base station $200_2$. Furthermore, it may be arranged for the remote base station 200 to belong to multiple base station groups.

Below, the control base stations $100_n$ ($100_1$, $100_2$, ..., $100_n$) have the same configuration, function, and status. Thus, unless otherwise indicated, they will be explained below as the control base station $100_n$. Below, remote base stations $200_m$ ($200_1$, $200_2$, ..., $200_m$) have the same configuration, function, and status. Thus, unless otherwise indicated, they will be explained below as the remote base station 200.

Control Base Station

Control base station 100 is a base station which collectively manages radio resources within a base station group. In other words, the control base station 100 has a function as a supervisory base station which supervises subordinate remote base stations 200. The control base station 100 has a user information receiver 102, a unit for collecting information within base station 104, a unit for transmitting information within base station 106, a resource allocation determining unit 108, an allocation information transmitter 110, a transmitter 112, a base station group determining unit 114, and a reference signal generator 116.

The user information receiver 102 receives an uplink signal transmitted by a user apparatus located in an area covered by the control base station 100, and obtains user information based on the uplink signal. The user information may include the number of users, location of the user, traffic volume, received quality, etc. The user information may be determined within the control base station 100 based on an uplink signal received from the user apparatus.

The unit for collecting information within base station 104 collects within the base station the user information obtained at the user information receiver 102. The information within the base station may include processing burden of the control base station. Moreover, the information within the base station may include user information of a remote base station which belongs to the control base station. Furthermore, the unit for collecting information within base station 104 may collect, within other base stations, user information and/or information within base station from a base station in other base station groups in order to change the base station group based on the user information and/or information within base station. For example, the unit for collecting information within base station 104 may collect the information within the base station and/or user information within another base station from another control base station in another base station group.

The unit for transmitting information within the base station 106 transmits, to other control base stations, the information within base station and/or user information collected at the unit for collecting information within base station 104.

Based on the information within base station and/or user information, a resource allocation determining unit 108 determines radio resources usable at a control base station and radio resources usable at a remote base station which belongs to the control base station. For example, as described with reference to FIG. 4, when radio resources include a radio resource usable by only one base station group and a radio resource usable in a manner common to all base station groups, the resource allocation determining unit 108 determines a radio resource usable at the control base station 100 and a radio resource usable at the remote base station 200 out of radio resources usable only by base station group 1 and a radio resource usable in a manner common to all base station groups.

The allocation information transmitter 110 transmits, to the remote base station 200, information on allocating radio resources usable at the remote base station 200 which belongs to the control base station 100. Moreover, the allocation information transmitter 110 transmits, to the remote base station, information for generating an independent RS to be used specifically by own base station for the control base station 100 and each remote base station and information for generating a common RS input by the reference signal generator 116. For example, the control base station 100 and the remote base station 200 are connected over wire.

The transmitter 112 allocates a radio resource to be actually used for transmission of user data out of radio resources usable at the control base station 100. Moreover, the transmitter 112 wirelessly transmits, to a subordinate user terminal, a downlink signal which includes a reference signal.

The base station group determining unit 114 determines a base station group based on information within base station and/or user information received from a remote base station and/or control base station which belongs to another base station group and a remote base station which belongs to the control base station 100. For example, the base station group determining unit 114 determines a base station group such that the number of remote base stations is equalized. Moreover, the base station group determining unit 114 may determine the base station group such that the user apparatuses located in the base station group are equalized. Furthermore, the base station group determining unit 114 may determine the base station group such that the traffic volume of the base station group is equalized. Moreover, the base station group determining unit 114 may be arranged to determine a base station group such that the number of users located at the communications area border of the base station group is reduced. Furthermore, the base station group determining unit 114 may be arranged to determine a base station group such that the received quality at the communications area border of the base station group is improved. The determining of the base station group may be performed in a centralized manner at one control base station or it may be coordinated among multiple control base stations.

The base station group determining unit 114 reports the determined base station group to the unit for collecting information within base station 104. The unit for collecting information within base station 104 collects information within the base station and/or user information within the base station group based on the reported base station group. Moreover, the resource allocation determining unit 108 determines a radio resource within the determined base station group. For example, the unit for collecting information within base station 104 stops collecting information within the base station and/or user information from a remote base station 200 which no longer belongs to the base station group. The base station group determining unit 114, which is typically included in the base station, may be included in a node which manages multiple base stations, such as RNC (Radio network controller).

The reference signal generator 116 generates a reference signal. The reference signal is a signal which is known between the base station and the user apparatus.

The reference signal includes the common RS and independent RS as described above. Moreover, the reference signal generating unit 116 generates information for generating the common RS, and information for generating the independent RS to be specifically used by each base station for each of the control base station 100 and each remote base station. Then, the reference signal generating unit 116 inputs, into the allocation information transmitter 110, information for generating the common RS, and information for generating the independent RS to be specifically used by each base station for each of the control base station 100 and each remote base station. For example, the common RS may include a predetermined sequence (for example, Non-patent document 2). Moreover, for example, the independent RS may preferably be orthogonalized between the control base station and the remote base station. For example, for orthogonalizing a reference signal between the remote base stations, code division multiplexing (CDM) may be applied, frequency division multiplexing (FDM) may be applied, or time division multiplexing (TDM) may be applied.

Moreover, for example, the independent RS preferably includes a sequence to which frequency shift is applied between the control base station and the remote base station. For example, the transmitting frequency of a reference signal transmitted by the control base station and each remote base station may be shifted. Moreover, for the independent RS, a time shift may be applied between the control base station and the remote base station. For example, the transmitting timing of the reference signal transmitted by the control base station and each remote base station may be shifted. Shifting the transmitting timing of the reference signal transmitted by the control base station and each remote base station makes it possible to orthogonalize the reference signal between the control base station and the remote base station. Moreover, the received quality measured in the user apparatus may be improved. Furthermore, the transmitting frequency and transmitting timing of a reference signal transmitted by the control base station and each remote base station may be shifted.

Moreover, the independent RS may be arranged to be include a sequence to which is applied a scramble code using a common RS for use in common between the control base station and the remote base station. For example, the independent RS preferably includes a sequence scrambled with a common RS for use in common between the control base station and the remote base station. The independent RS may be scrambled using the common RS in order to randomize a reference signal between remote base stations which belong to different control base stations.

Figure 6:
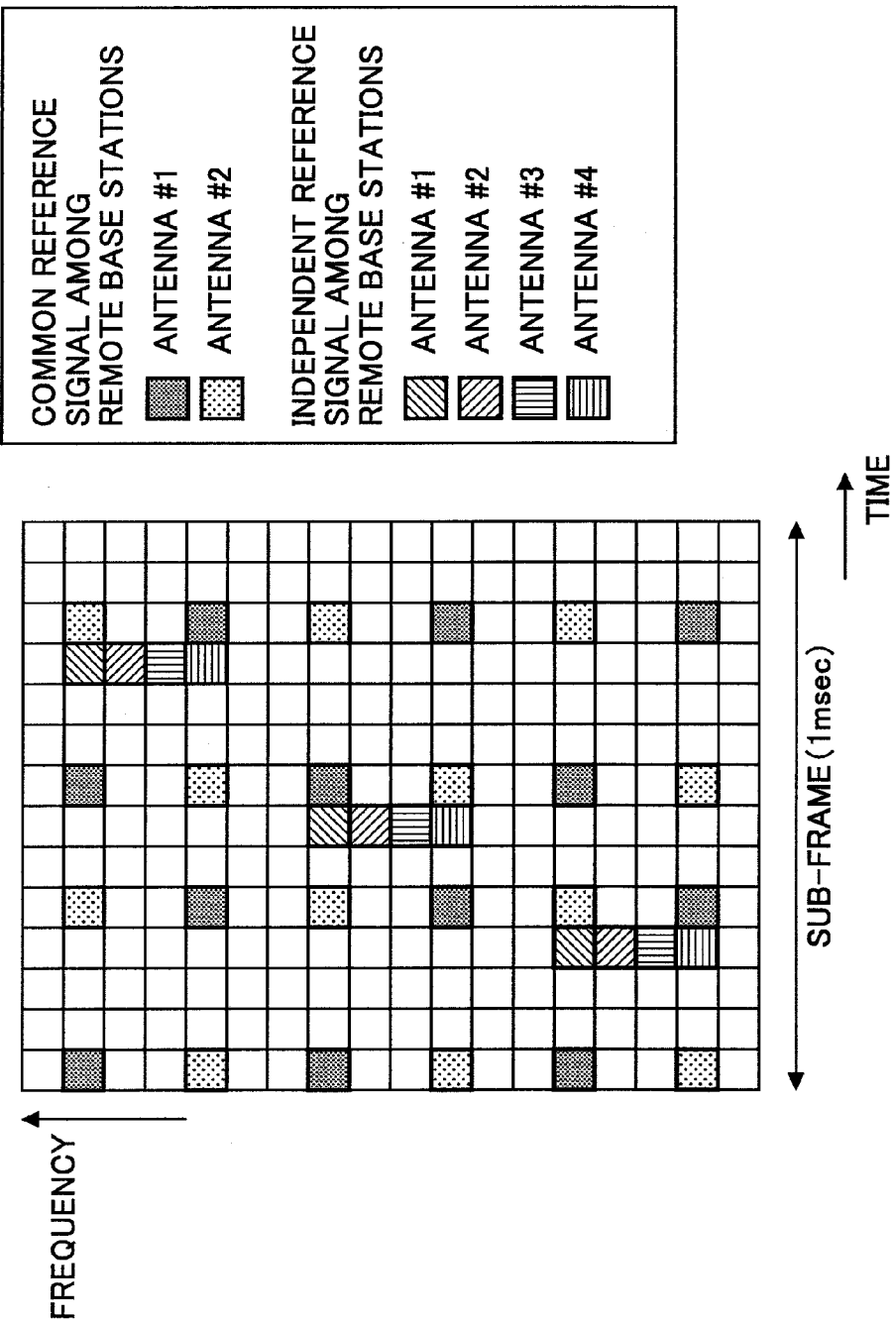
FIG. 6 is an explanatory diagram illustrating one example of mapping of a reference signal transmitted by the remote base station and the control base station according to one embodiment.

Moreover, for example, the common RS and the independent RS are mapped as shown in FIG. 6. As the independent RS is used for measuring received quality in each cell, it suffices for the overhead to be small in comparison to the common RS. For example, the common RS is arranged densely in comparison to the independent RS. Moreover, the common RS may be transmitted with antennas, the number of which is no more than the number of antennas which the control base station has. For example, even when the control base station 100 has multiple antennas, the common RS may be arranged to be transmitted in antennas, the number of which may be smaller than the above-mentioned multiple antennas. For example, the common RS may be transmitted with two antennas. Moreover, it may be transmitted using three or more antennas. On the other hand, the independent RS needs to be transmitted with antennas, the number of which is the number of antennas which the control base station has. This is for the user apparatus to determine the PMI based on the independent RS.

Figure 7:
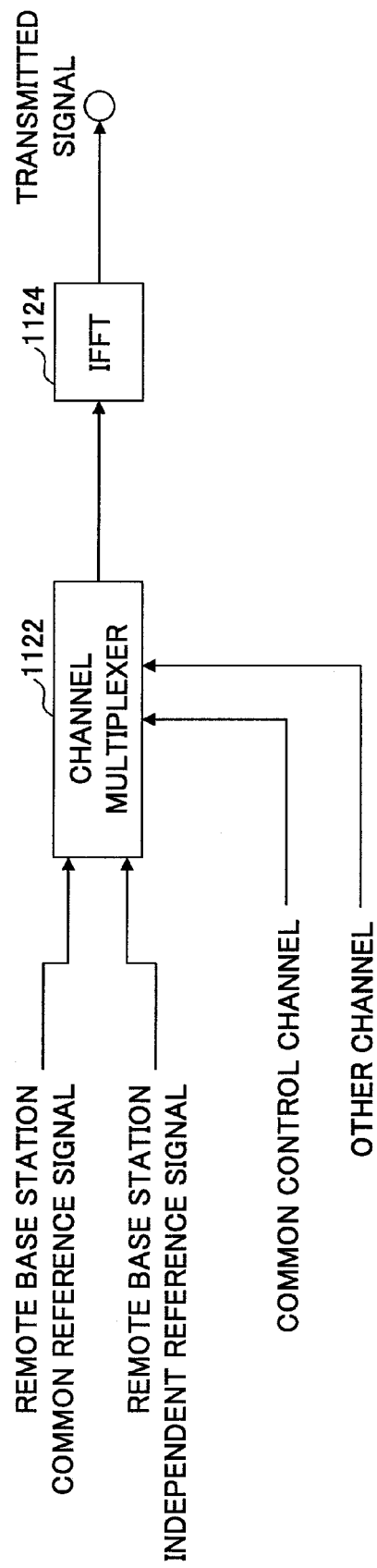
FIG. 7 is a partial block diagram illustrating a transmitter in the remote base station and the control base station according to one embodiment.

A transmitter 112 in the control base station 100 according to the embodiment of the present invention is explained with reference to FIG. 7.

The transmitter 112 has a channel multiplexer 1122 and an inverse fast Fourier transforming unit (IFFT) 1124.

To the channel multiplexer 1122 are input a common RS for use in common in the control base station and the remote base station and an independent RS for use specific to each of the control base station and the remote base station. For example, the common RS and the independent RS are input by the reference signal generator 116. Moreover, a common control channel and a channel other than the common control channel are input. As described above, the common control channel includes broadcast and paging channels.

The channel multiplexer 1122 multiplexes channels input. For example, the channel multiplexer 1122 performs mapping as described with reference to FIG. 6. A signal mapped in the channel multiplexer 1122 is input to the IFFT 1124.

The IFFT 1124 performs inverse fast Fourier transform on the signal input. The inverse fast Fourier transformed signal is subsequently transmitted wirelessly to the user apparatus 300 as a transmitting signal.

Remote Base Station

The remote base station 200 is a base station for which radio resources are managed by the control base station 100. The remote base station 200 has a user information receiver 202, a unit for transmitting information within base station 204, an allocating information receiver 206, a transmitter 208, and a reference signal generator 210.

The user information receiver 202 receives an uplink signal from a user apparatus located in an area covered by the remote base station 200, and collects user information based on the uplink signal. The user information may include the number of users, location of the users, traffic volume, and received quality.

The unit for transmitting information within base station 204 transmits, to the control base station 100, information within the base station and user information collected at the user information receiver 202. The information within the base station may include processing burden in the remote base station 200.

The allocating information receiver 206 receives, from the control base station 100, information for allocating radio resources usable at the remote base station 200. Moreover, the allocating information receiver 206 receives, from the control base station 100, information for generating a common RS, and information for generating independent RSs to be specifically used by the base stations one for the control base station 100 and one for each remote base station. The allocating information receiver 206 inputs, into the reference signal generator 210, the received information for generating the common RS and information for generating the independent RSs to be specifically used by the base stations one for the control base station 100 and one for each remote base station.

The transmitter 208 allocates a radio resource to be actually used for transmission of user data out of radio resources usable at the remote base station 200, and performs data transmission. Moreover, the transmitter 208 wirelessly transmits, to a subordinate user terminal, a downlink signal, including a reference signal.

Furthermore, when the remote base station 200 belongs to multiple base station groups, the allocation information receiver 206 receives allocation information from multiple control base stations. For example, the transmitter 208 determines a base station group according to a location of a user, and uses a radio resource allocated from a control base station of a determined base station group to transmit data. The radio resource allocated from the control base station of the base station group determined according to the location of the user is used to transmit the data, making it possible to perform control such that radio resources allocated from multiple control base stations do not overlap.

The reference signal generator 210 generates a reference signal. For example, the reference signal generator 210 generates a reference signal based on information for generating a common RS input by the allocation information receiver 206, and information for generating independent RSs to be specifically used by the base stations one for the control base station 100 and one for each remote base station. The reference signal includes the common RS and the independent RS as described above. For example, the common RS may include a predetermined sequence. Moreover, for example, the independent RS may preferably be orthogonalized between the control base station and the remote base stations. For example, for orthogonalizing a reference signal between the remote base stations, code division multiplexing may be applied, frequency division multiplexing may be applied, and time division multiplexing may be applied.

Moreover, for example, the independent RS preferably includes a sequence to which frequency shift is applied between the control base station and the remote base station. For example, the transmitting frequency of a reference signal transmitted by the control base station and each remote base station may be shifted. Moreover, for the independent RS, a time shift may be applied between the control base station and the remote base station. For example, the transmitting timing of a reference signal transmitted by the control base station and each remote base station may be shifted. In this way, a reference signal may be orthogonalized between the control base station and the remote base stations. Moreover, the received quality measured in the user apparatus may be improved. Furthermore, the transmitting frequency and transmitting timing of a reference signal transmitted by the control base station and each remote base station may be shifted.

Moreover, the independent RS may be arranged to include a sequence to which is applied a scramble using a common RS for use in common between the control base station and the remote base station. For example, the independent RS preferably includes a sequence scrambled with a common RS for use in common between the control base station and the remote base station. The independent RS may be scrambled using the common RS in order to randomize a reference signal between remote base stations which belong to different control base stations.

Moreover, for example, the common RS and the independent RS are mapped as described with reference to FIG. 6. As the independent RS is used for measuring received quality in each cell, it suffices for the overhead to be small in comparison to the common RS. For example, the common RS may be arranged densely in comparison to the independent RS. Moreover, the common RS may be transmitted with antennas, the number of which is no more than the number of antennas which the remote base station has. For example, even when the remote base station 200 has multiple antennas, the common RS may be arranged to be transmitted with antennas, the number of which being smaller than the above-mentioned multiple antennas. For example, the common RS may be transmitted with two antennas. Moreover, it may be transmitted using three or more antennas. On the other hand, the independent RS needs to be transmitted with antennas, the number of which is the number of antennas which the remote base station has. This is for the user apparatus to determine the PMI based on the independent RS.

For the transmitter 208 in the remote base station 200 according to the present embodiment, it is similar to the transmitter described with reference to FIG. 7.

User Apparatus

Figure 8:
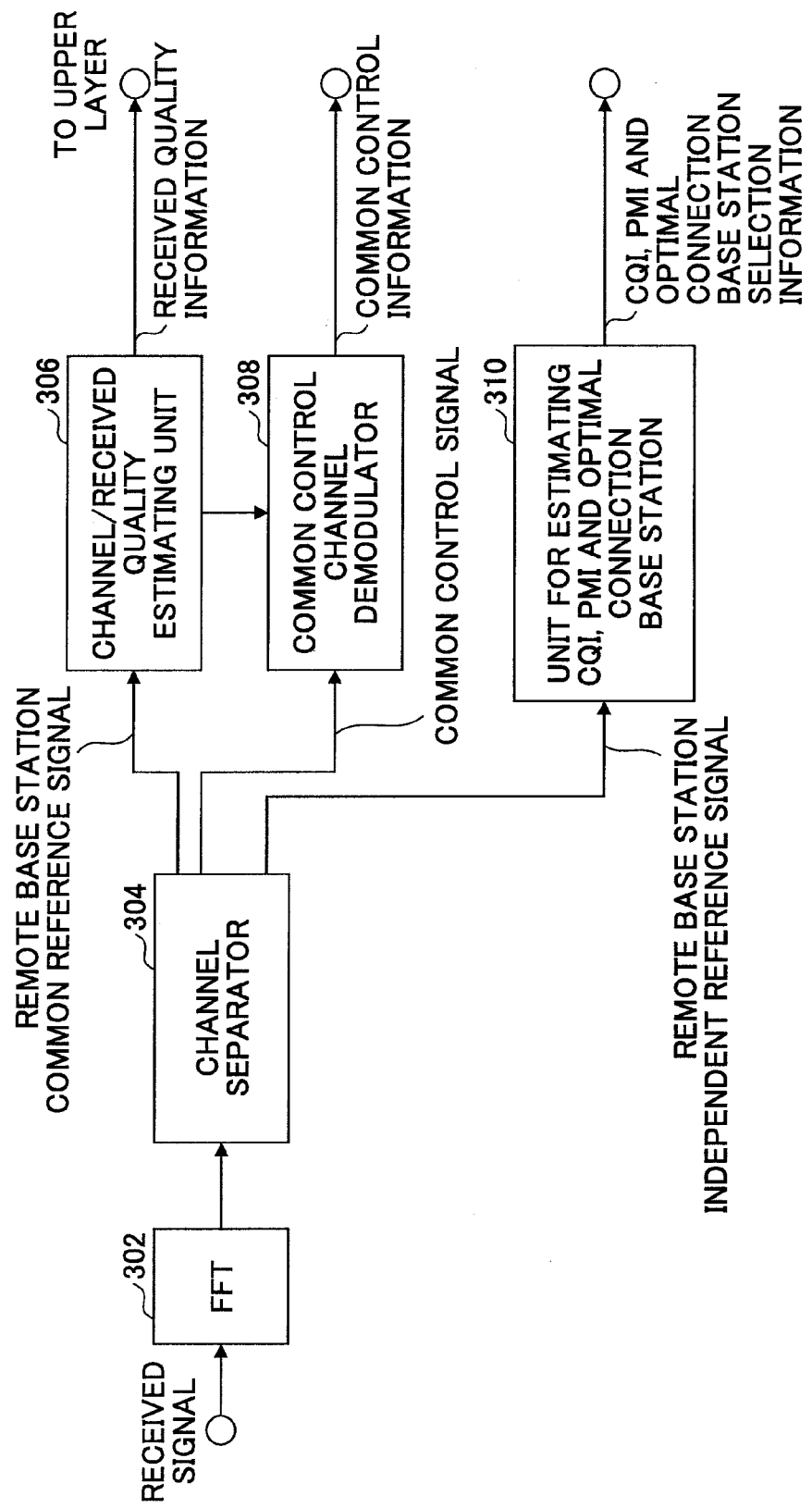
FIG. 8 is a partial block diagram illustrating a user apparatus according to one embodiment.

A user apparatus according to the present embodiment is explained with reference to FIG. 8.

The user apparatus 300 according to the present embodiment includes a fast Fourier transforming unit 302, a channel separator 304, a channel/received quality estimating unit 306, a common control channel demodulator 308, and a unit for estimating CQI, PMI, and optimal connection base station 310.

The FFT 302 performs fast Fourier transformation on a downlink signal transmitted by a remote base station 200 or a control base station 100 which covers an area in which the user apparatus is located. The FFT 302 inputs the fast Fourier transformed downlink signal to the channel separator 304.

The channel separator 304 separates a channel included in the fast Fourier transformed downlink signal input. For example, the downlink signal includes a common RS, an independent RS, and a common control channel. The channel separator 304 inputs the common RS into the channel/received quality estimating unit 306. Moreover, the channel separator 304 inputs the common control channel into the common control channel demodulator 308. Furthermore, the channel separator 304 inputs the independent RS into a unit for estimating CQI, PMI, and optimal connection base station 310.

The channel/received quality estimating unit 306 estimates received quality and/or channel quality of the common RS based on the input common RS. The received quality includes the CQI. For example, the channel/received quality estimating unit 306 may measure the received quality based on the common RS in the following cases:

(1) When data are simultaneously transmitted from the control base station and the remote base station in downlink; and (2) When located in the vicinity of the control base station or the remote base station.

This is because, for (2), a signal transmitted from a base station other than the control base station or the remote base station may be ignored.

The channel/received quality estimating unit 306 reports, to an upper layer, received quality information which indicates the estimated received quality. Moreover, the channel/received quality estimator 306 inputs the received quality information into the common control channel demodulator 308.

The common control channel demodulator 308 demodulates a common control channel input, based on received quality information input by the channel/received quality estimator 306. Then, the common control channel demodulator 308 reports, to the upper layer, common control information, which is a demodulated common control channel.

The unit 310 for estimating CQI, PMI, and optimal connection base station estimates CQI based on an independent RS. Moreover, the CQI, PMI, and optimal connection base station estimating unit 310 determines PMI based on the independent RS. For example, based on the predetermined precoding vector, the unit for estimating CQI, PMI, and optimal connection base station 310 estimates received quality when the precoding vector is applied. Moreover, the CQI, PMI, and optimal connection base station estimating unit 310 determines an optimal base station as a party to connect to. Then, the unit for estimating CQI, PMI, and optimal connecting base station 310 reports, to an upper layer, the estimated CQI, PMI, and base station which is optimal as a party to connect to. The PMI may include an index corresponding to a precoding vector and received quality when the precoding vector is applied.

For example, the unit for estimating the CQI, PMI, and optimal connection base station 310 may measure received quality based on an independent RS when data is transmitted from a single control base station or remote base station in downlink.

Moreover, in the above-described user apparatus 300, a received quality (CQI) which is measured based on an independent RS and a received quality (CQI) which is measured based on a common RS may be compared to report one of the received qualities to the upper layer. For example, a received quality estimated based on an independent RS in the unit for estimating CQI, PMI, and optimal connection base station 310 and a received quality estimated based on a common RS in the channel/received quality estimating unit 306 may be compared and report the better received quality to the upper layer. In this case, the user apparatus 300 may be arranged to measure the received quality based on an independent RS included in a reference signal transmitted from the remote base station 200 and/or multiple control base stations 100 which can receive the user apparatus 300.

Operation of Radio Communications System (Part 1)

A radio communications system according to the present embodiment is described with reference to FIG. 9.

Based on the received quality measured by a user apparatus 300, a process is explained of switching connecting cells at high speed within a base station group.

The user apparatus 300 is located in an area covered by a remote base station 200$_1$.

A control base station 100, and remote base stations 200$_1$ and 200$_2$ transmit a reference signal (steps S802, S804, and S806).

The reference signal is received at the user apparatus 300. The user apparatus 300 measures the received quality of the reference signal (step S808). For example, the user apparatus 300 measures the received quality based on an independent RS included in the reference signal. Then, the user apparatus 300 reports, to a remote base station 200$_1$ which covers an area in which the user apparatus 300 is located, a received quality and an ID of a base station with the best received quality based on the measured received quality (step S810).

The remote base station 200$_1$ reports, to the control base station 100 a received quality and an ID of a base station with the best received quality that is reported (step S812).

Based on the received quality and base station ID of the base station that is reported, the control base station 100 switches the base station to be connected to the user apparatus 300 to the reported base station (step S814). For example, the control base station 100 switches the base station to be connected to the user apparatus 300 to the remote base station 200$_2$.

The control base station 100 transmits, to the remote base station 200₂, data to be transmitted to the user apparatus 300.

The remote base station 200₂ transmits, to the user apparatus 300, data transmitted by the control base station 100 (step S818).

Operation of Radio Communications System (Part 2)

Other operations of the radio communications system according to the present embodiment is described with reference to FIG. 10.

A process is explained of performing handover which involves changing a base station group based on received quality measured by the user apparatus 300.

The user apparatus 300 is located in an area covered by a remote base station 200₁. The remote base station 200₁ belongs to a base station group 1.

A control base station 100₁, a remote base station 200₁, a control base station 100₂ and a remote base station 200₂ transmit reference signals (steps S902, S904, S906, and S908).

The reference signals are received at the user apparatus 300. The user apparatus 300 measures the received quality of the reference signals (step S910). For example, the user apparatus 300 measures the received qualities based on a common RS included in the reference signals. Then, based on the measured received quality, the user apparatus 300 determines whether the received quality meets handover conditions. For example, the user apparatus 300 may determine whether a received quality of a residing base station group 1 is better than a received quality of another base station group 2.

When handover conditions are met, the user apparatus 300 transmits a handover request to a residing remote base station 200₁ (step S912).

The handover request is transmitted to a control base station 100₁ which controls the remote base station 200₁ (step S914).

The control base station 100₁ transmits information on connecting with the user apparatus 300 to the control base station 100₂ of the base station group 2 to handover to (step S916).

The user apparatus 300 transmits a random access channel (RACH) to a remote base station with the best received quality 200₂ (step S918).

The RACH is transmitted to a control base station 100₂ which controls the remote base station 200₂ (step S920).

The control base station 100₂ performs a process of link connection between the remote base station 200₂ and the user apparatus 300 (step S922).

The control base station 100₂ transmits, to the remote base station 200₂, data to be transmitted to the user apparatus 300 (step S924).

The remote base station 200₂ transmits, to the user apparatus 300, data transmitted by the control base station 100₂ (step S926).

Figure 9:
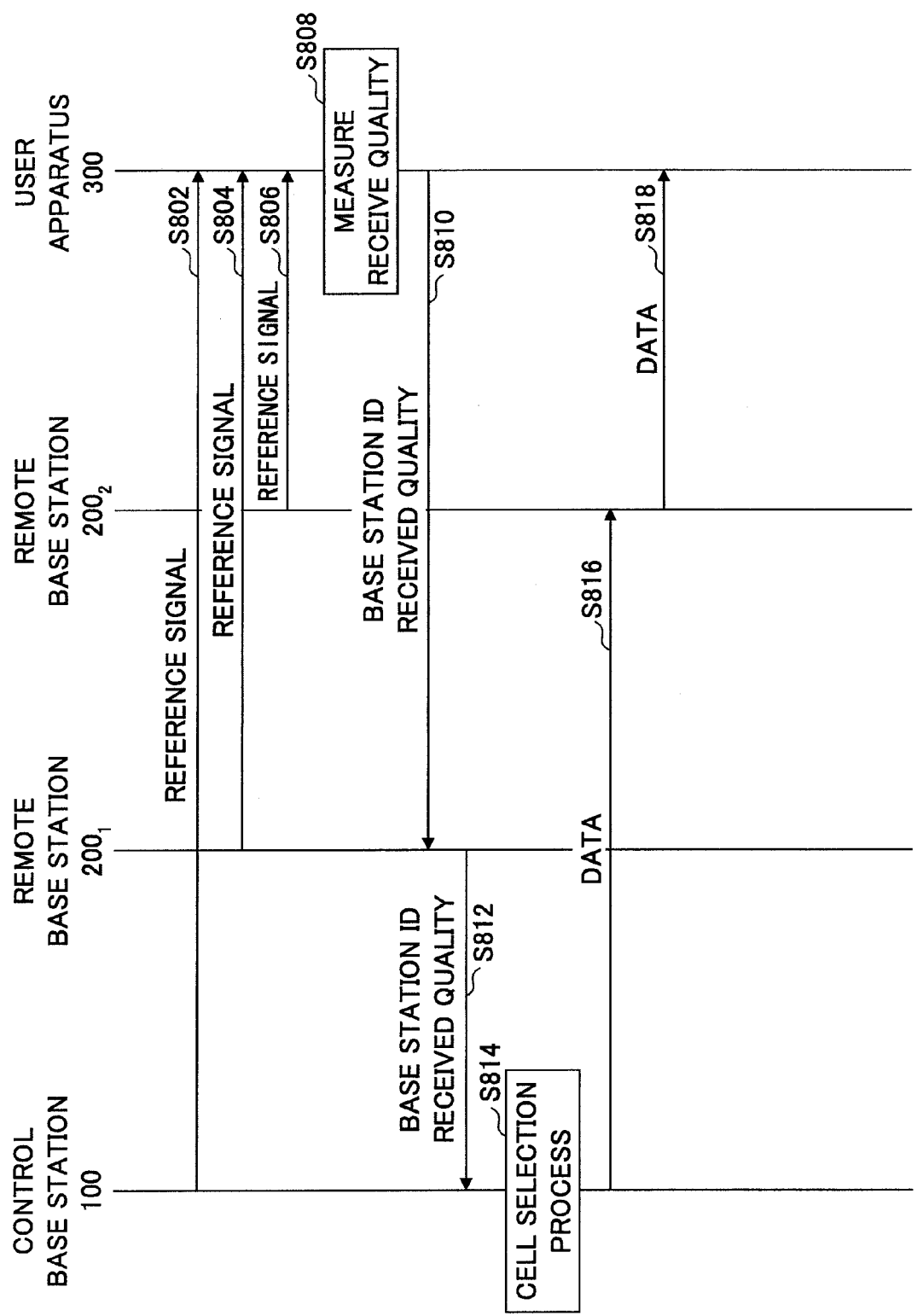
FIG. 9 is a flow diagram illustrating an operation of the radio communications system according to one embodiment.
Figure 10:
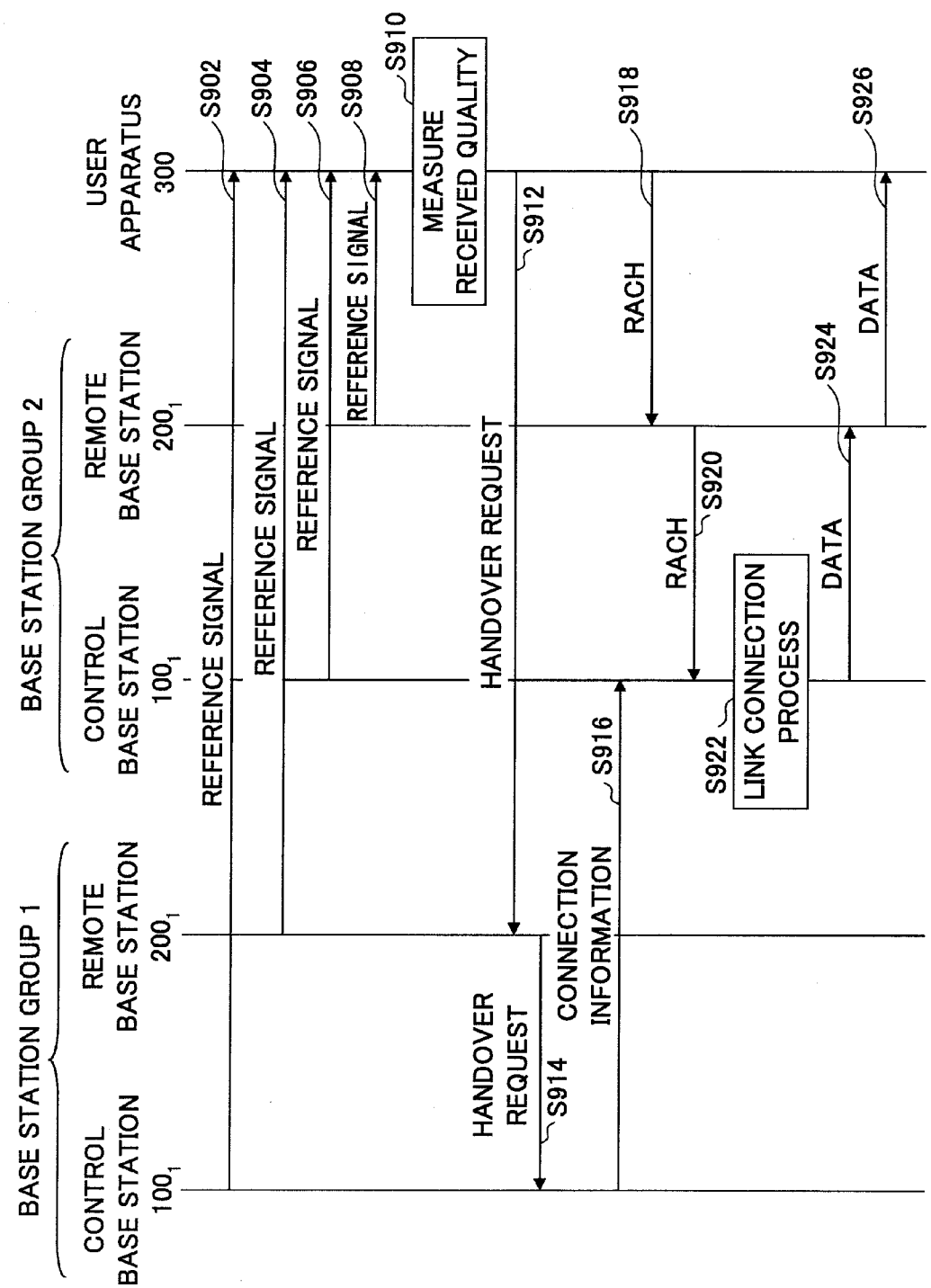
FIG. 10 is another flow diagram illustrating an operation of the radio communications system according to one embodiment.

Processes explained with reference to FIGS. 9 and 10 are performed in parallel. For example, the processes differ in the period thereof. The process explained with reference to FIG. 9 is performed at high speed, while the process explained with reference to FIG. 10 is performed at low speed.

According to the present embodiment, a reference signal transmitted by a control base station and one or more remote base stations controlled by the control base station includes a sequence for use in common between the control base station and remote base stations (first known signal) and sequences for use specific to each of the control base station and the remote base station (second known signals). The control base station and one or more remote base stations which are controlled (supervised) by the control base station may be called a base station group.

A sequence for use in common between the control base station and remote base station is included in a reference signal, so that a common sequence is transmitted in an area covered by a base station group, making it possible to improve the received quality for the user apparatus located at a cell edge. Moreover, cell switching may be performed based on the sequence for use in common between the control base station and the remote base station, making it possible to reduce handover processing burden within the base station group.

Moreover, sequences for use specific to each of the control base station and the remote base station are included in the reference signal, so that a user apparatus may measure the received quality in each cell. Furthermore, cell switching among base stations included in the base station group may be performed at high speed.

In the above described embodiments, examples in systems to which Evolved UTRA and UTRAN (also called Long Term Evolution or Super 3G) is applied have been described. However, the radio communications system, user apparatuses, and methods according to the present invention can be applied to all communications systems with any possibility of intercell interference occurring.

For convenience of explanation, specific numerical value examples are used to facilitate understanding of the present invention. However, unless otherwise specified, such numerical values are merely exemplary, so that any appropriate value may be used.

As described above, while the present invention is described with reference to specific embodiments, the respective embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-172813 filed on Jul. 1, 2008, the entire contents of which are hereby incorporated by reference.

The invention claimed is:

1. A mobile communications system, comprising:
   a first base station; and
   at least one second base station that belongs to the first base station,
      wherein the first base station includes
         a first generator which generates a first known signal that is common to the first base station and the second base station and a second known signal that is specific to the first base station, and
         a first radio transmitter which wirelessly transmits, to a subordinate terminal apparatus, the first known signal and the second known signal specific to the first base station;
      wherein the second base station includes a second generator which generates the first known signal and a second known signal that is specific to the second base station; and wherein each of the first generator and the second generator generates the second known signal which includes a sequence scrambled by the generated first known signal that is common to the first base station and the second base station.

2. The mobile communications system as claimed in claim 1, wherein the first base station includes
a radio transmitter which transmits, to each of the second base stations over wire, information for generating the first known signal, and information for generating the second known signal to be specifically used by each of the second base stations,
wherein the second base station includes
the second generator which generates the first known signal and the second known signal based on the information for generating the first known signal and the information for generating the second known signal, and
a second radio transmitter which wirelessly transmits the first known signal and the second known signal which are generated by the second generator.

3. The mobile communications system as claimed in claim 2, wherein
the second generator generates the second known signal such that it becomes orthogonal to a first base station-transmitted second known signal.

4. The mobile communications system as claimed in claim 2, wherein
the second generator generates the second known signal which includes a sequence, which sequence is a first base station-transmitted second known signal that is shifted in frequency and/or time.

5. The mobile communications system as claimed in claim 2, wherein
the first base station and the second base station have multiple antennas, and
the first radio transmitter and the second radio transmitter transmit the first known signal with two or more antennas.

6. The mobile communications system as claimed in claim 2, wherein
the first base station and the second base station have multiple antennas, and
the first radio transmitter and the second radio transmitter transmit the second known signal with all antennas which the base station has.

7. The mobile communications system as claimed in claim 1, wherein
wherein the first base station includes
a switching unit which switches a base station to communicate with a user apparatus based on a received quality measured based on the second known signal reported by the user apparatus.

8. The mobile communications system as claimed in claim 1, wherein
when a user apparatus conducts handover based on a received quality measured based on the first known signal,
the first base station includes
a connection information reporting unit which reports information on connecting with the user apparatus to a first base station to handover to based on a handover request transmitted by the user apparatus.

9. A base station, comprising:
a first known signal generator which generates a first known signal that is common to one or more base stations to be supervised;
a second known signal generator which generates multiple second known signals that are specific to each base station;
a radio transmitter which wirelessly transmits, to a subordinate terminal apparatus, the first known signal and second known signals specific to the first base station; and
a wired transmitter which transmits, over wire to the one or more base stations, information for generating the first known signal and which transmits, over wire to each of the one or more base stations, information for generating the second known signals to be used specifically by the respective base stations;
wherein each of the first known signal generator and the second known signal generator generates the second known signal which includes a sequence scrambled by the generated first known signal that is common to the base stations.

10. A user apparatus in a mobile communications system having a first base station and at least one second base station that belongs to the first base station, the user apparatus comprising:
a received quality measuring unit which measures received quality based on a downlink signal; and
a reporting unit which reports, to a base station which covers an area in which the user apparatus is located, the received quality measured by the received quality measuring unit, wherein
the received quality measuring unit measures the received qualities based on second known signals for use specific to the respective first base station and the second base station that are transmitted by the first base station or the second base station,
wherein the second known signals include a sequence scrambled by first known signals that is common to for use in common at the first base station and the second base station.

11. The user apparatus as claimed in claim 10, wherein
the received quality measuring unit measures the received quality based on a first known signal for use in common between the first base station and the second base station that is transmitted by the first base station or the second base station, wherein the user apparatus includes
a received quality comparing unit which compares a received quality measured based on the first known signal and received qualities measured based on the second known signals, and wherein
the reporting unit reports, to the base station which covers an area in which the user apparatus is located, one of the received qualities based on a comparison result at the received quality comparing unit.

12. A method in a mobile communications system having a first base station and at least one second base station that belongs to the first base station, comprising:
a signal generating step in which the first base station and the second base station generate a first known signal that is common to the first base station and the second base station and a second known signal that is specific to the first base station;
a step in which the first base station and the second base station wirelessly transmit, to a subordinate terminal apparatus, the first known signal and the second known signal specific to the first base station; and
a step in which each of the first base station and the second base station generates the second known signal which includes a sequence scrambled by the generated first known signal that is common to the first base station and the second base station.

* * * * *